US006947919B2

United States Patent
Naset et al.

(10) Patent No.: US 6,947,919 B2
(45) Date of Patent: Sep. 20, 2005

(54) REVERSING THE ORDER OF A GROUP OF OBJECTS IN LOGARITHMIC TIME

(75) Inventors: Jeffrey Naset, Richardson, TX (US); Mark Nathan Hattarki, Dallas, TX (US); Charles R Plaine, Dallas, TX (US); David L Maison, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 739 days.

(21) Appl. No.: 09/957,878

(22) Filed: Sep. 20, 2001

(65) Prior Publication Data

US 2003/0055803 A1 Mar. 20, 2003

(51) Int. Cl.[7] ............................. G06F 17/00; G06N 5/02
(52) U.S. Cl. ........................ 706/46; 706/47; 706/932; 712/300
(58) Field of Search ........................... 706/46, 47, 932; 712/300

(56) References Cited

U.S. PATENT DOCUMENTS

| 6,388,586 | B1 | * | 5/2002 | Fischer et al. | ................. 341/51 |
| 2003/0014550 | A1 | * | 1/2003 | Fischer et al. | .............. 709/310 |
| 2003/0014616 | A1 | * | 1/2003 | Makphaibulchoke et al. | .... 712/300 |

* cited by examiner

*Primary Examiner*—Joseph P. Hirl
(74) *Attorney, Agent, or Firm*—Thomas M. Croft

(57) ABSTRACT

The order of a group of objects is reversed in logarithmic time. The invention may be applied to a wide variety of applications. An exemplary embodiment is included in which the invention may be used to reverse the order of the bits contained in a computer register.

16 Claims, 9 Drawing Sheets

REVERSING THE ORDER OF A GROUP OF OBJECTS IN LOGARITHMIC TIME

FIELD OF THE INVENTION

The present invention relates generally to the manipulation of objects and, more specifically, to reversing the order of a group of objects.

BACKGROUND OF THE INVENTION

A common problem is that of reversing the order of a group of objects. This problem occurs in fields as diverse as the collation of pages in a document, the sorting of records in a database, the arrangement of dancers in a choreographed performance, and the reversal of bits in a computer storage register. In the latter case, for example, bit reversal is often accomplished by operating on a single bit at a time or by using one or more look up tables. Further, some bit reversal methods rely on looping, branching, and memory accesses that reduce speed and efficiency. The other applications listed above and many others benefit from a rapid, efficient method for reversing the order of a group of objects, whatever those objects happen to be. It is thus apparent that there is a need in the art for an improved method for reversing the order of a group of objects.

SUMMARY OF THE INVENTION

A method is provided for reversing the order of a group of objects. An apparatus is also provided for implementing the method in the context of an exemplary embodiment of the invention.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1C is an illustration of the group of objects shown in FIG. 1A after the positions of the sub-groups shown in FIG. 1B have been interchanged in accordance with an exemplary embodiment of the invention.

DETAILED DESCRIPTION OF THE INVENTION

The invention has broad applicability to any situation in which the order of a group of objects must be reversed. For example, the invention may be used to reverse the order of pages in a document, to implement a card trick, to reorder a line of dancers in a choreographed performance, to reorder records in a database, or to reverse the order of bits in a computer register. The invention is particularly useful when the number of objects in the group is a positive-integer power of two.

Figure 1A:
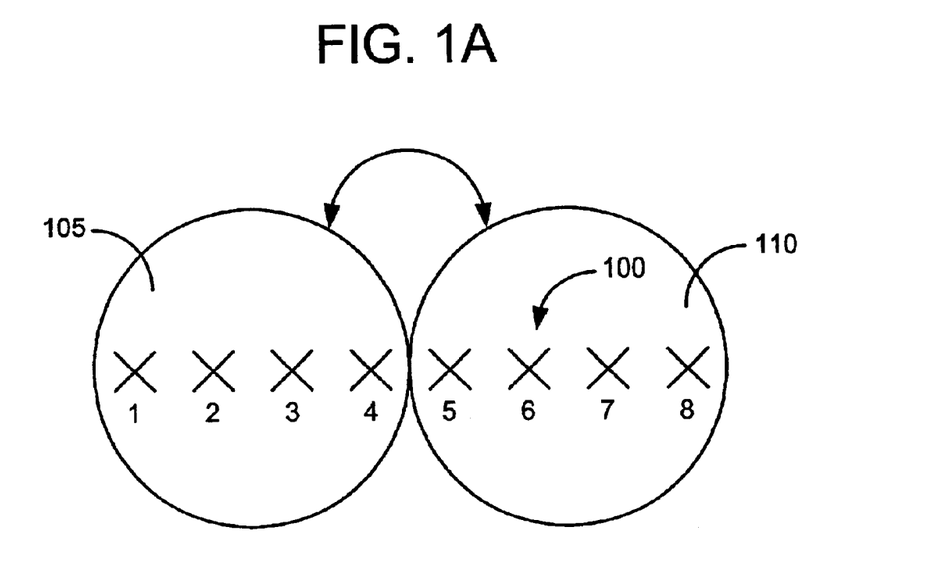
FIG. 1A is an illustration of a group of objects whose order is to be reversed.
Figure 1B:
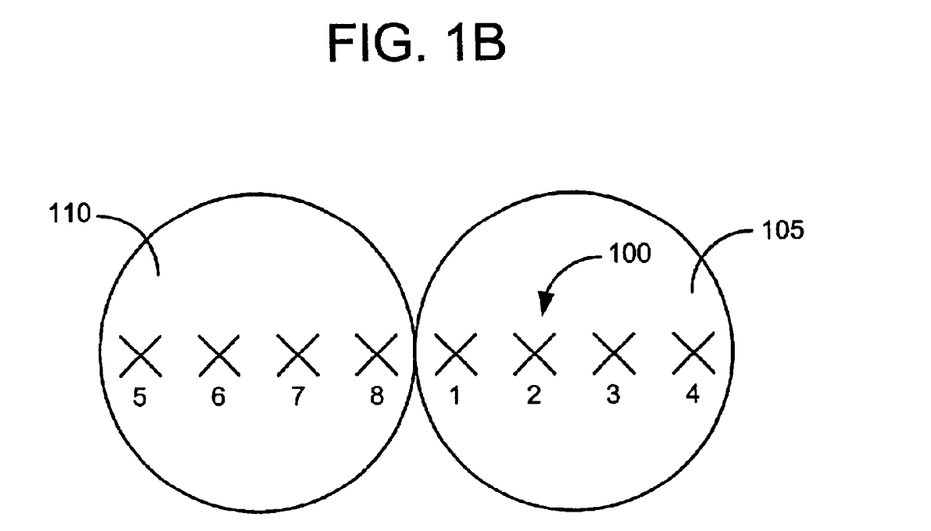
FIG. 1B is an illustration of the group of objects shown in FIG. 1A after a first partitioning of the objects into sub-groups has been performed in accordance with an exemplary embodiment of the invention.
Figure 1D:
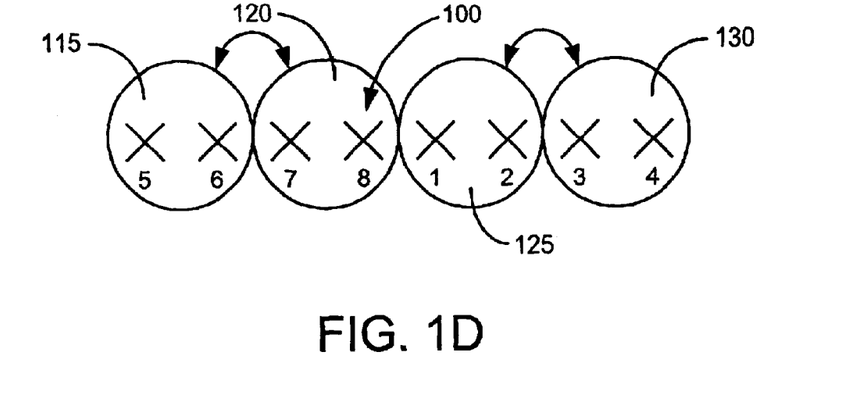
FIG. 1D is an illustration of the group of objects shown in FIG. 1A after a second partitioning of the objects into sub-groups has been performed in accordance with an exemplary embodiment of the invention.
Figure 1E:
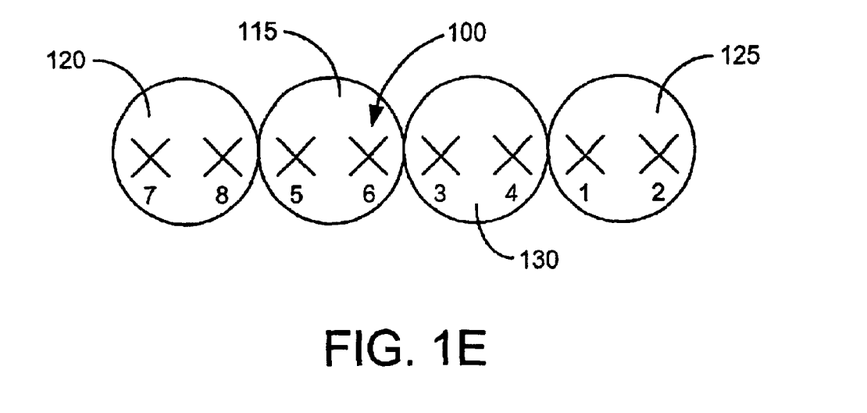
FIG. 1E is an illustration of the group of objects shown in FIG. 1A after the positions of adjacent pairs of sub-groups shown in FIG. 1D have been interchanged in accordance with an exemplary embodiment of the invention.
Figure 1F:
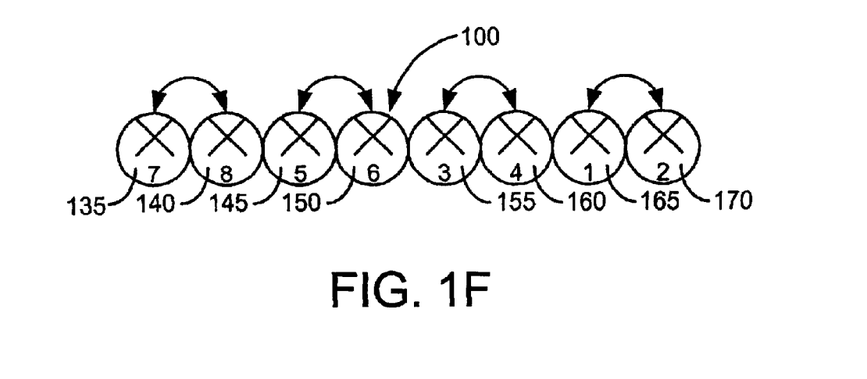
FIG. 1F is an illustration of the group of objects shown in FIG. 1A after a third partitioning of the objects into sub-groups has been performed in accordance with an exemplary embodiment of the invention.

FIGS. 1A–1G show a step-by-step overview of the process of reversing the order of a group of objects in accordance with an exemplary embodiment of the invention. FIG. 1A shows a group of objects 100 numbered from 1 to 8. Eight objects have been included in the figure for simplicity in explaining the invention. The principles of the invention generalize to any number of objects that is a positive-integer power of two. In FIG. 1B, the group of objects 100 has been partitioned into two sub-groups, 105 and 110, each of which contains an equal number of objects (in this case, four). FIG. 1C shows the group of objects 100 after the positions of sub-groups 105 and 110 have been interchanged. In FIG. 1D, the group of objects 100 as reordered in FIG. 1C has been partitioned into four sub-groups (115, 120, 125, and 130) of two objects each. In FIG. 1E, the positions of adjacent pairs of sub-groups in FIG. 1D have been interchanged. In FIG. 1F, the group of objects 100 as reordered in FIG. 1E has been partitioned into eight sub-groups (135, 140, 145, 150, 155, 160, 165, and 170) of one object each. Finally, in FIG. 1G, the positions of adjacent pairs of sub-groups formed in FIG. 1F have been interchanged to compete the reversal of the order of the original group of objects 100 shown in FIG. 1A.

In the particular exemplary embodiment discussed in connection with FIGS. 1A–1G, the partitioning of the group of objects 100 into sub-groups proceeds from coarse to fine. Each partitioning of a group of objects into sub-groups and interchanging adjacent pairs of sub-groups, hereinafter referred to as a "partition-and-interchange step," may be considered a "pass" or "stage" in the reversal process. In the exemplary embodiment of FIGS. 1A–1G, two sub-groups are formed during the first pass; on the second, four; and on the third and final pass, eight. In other words, the group of objects is partitioned, on each of three passes, into a unique set of sub-groups containing the same number of objects. In general, for $2^N$ objects, the group of objects is partitioned into $\log_2(2^N)=N$ unique sets of equally sized sub-groups. For the unique set of $2^j$ sub-groups associated with the jth pass (j=1, 2, 3, . . . , N), each sub-group contains $2^{(N-j)}$ objects. However, the order in which the N partition-and-interchange steps are performed is arbitrary. For example, the sub-groups may instead progress from fine to coarse, in which case the unique set of $2^{(N-j+1)}$ sub-groups associated with the jth pass (j=1, 2, 3, . . . , N) comprises sub-groups of $2^{(j-1)}$ objects each. Furthermore, there is no requirement that the unique sets of sub-groups contain monotonically increasing or decreasing numbers of sub-groups. In fact, the partition-and-interchange steps may be performed in any desired order. Stated more formally, it may be easily verified that the order of a group of $2^N$ objects may be reversed by selecting a set of N integers comprising all powers of two between 1 and $2^{(N-1)}$, inclusive; partitioning the group of $2^N$ objects into sub-groups, each sub-group having a number of objects equal to a unique one of the set of N integers; interchanging the positions of adjacent pairs of sub-groups; and repeating the process for the remaining (N−1) integers in the set. Note that the group of objects operated upon during all passes subsequent to the first pass is the result of the previous pass. In the specific example shown in FIG. 1A involving a group of eight objects 100, N equals 3, and a set of integers comprising 1, 2, and 4 may be selected. The group of objects 100 is partitioned into three unique sets of sub-groups, each sub-group within a given set having a number of objects equal to a unique one of these three integers (1, 2, or 4). Thus, the number of objects in each sub-group during the three passes could be any one of, respectively, 1, 2, and 4; 1,4, and 2; 2, 4, and 1; 2, 1, and 4; 4, 1, and 2; or 4, 2, and 1 for a total of six possible orderings. The choice of an ordering depends on the application and the implementer's preferences. Assuming that each partition-and-interchange step is performed in one time unit (all interchanges of position take place simultaneously during each partition-and-interchange step), a group of $2^N$ objects may be reversed in a time proportional to $\log_2(2^N)=N$, in logarithmic time. That is, letting $M=2^N$, the performance is O(log(M)).

Figure 1G:
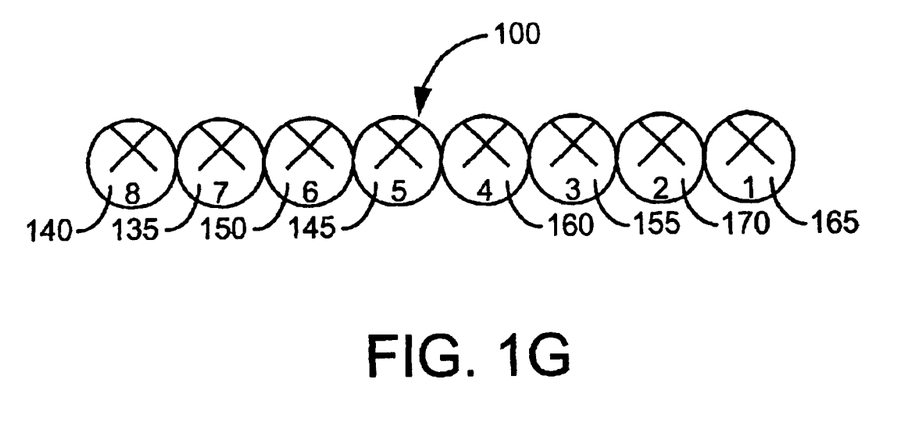
FIG. 1G is an illustration of the group of objects shown in FIG. 1A after the positions of adjacent pairs of sub-groups shown in FIG. 1F have been interchanged in accordance with an exemplary embodiment of the invention.

The embodiment discussed in connection with FIGS. 1A–1G may also be interpreted from a recursive point of view, although the performance of a recursive implementation is sub-optimal (O(M)). In FIG. 1B, the group of objects 100 has been subdivided into two sub-groups (105 and 110) of equal size, and the positions of the two sub-groups are interchanged to result in the new ordering shown FIG. 1C. The same procedure is next applied recursively to each sub-group 105 and 110, resulting in each sub-group 105 and 110 being further subdivided into two sub-groups (115, 120, 125, and 130), as shown in FIG. 1D. Within each newly subdivided sub-group 105 and 110, the positions of the two new sub-groups are interchanged (115 with 120 and 125 with 130), as shown in FIG. 1E. The same procedure is again applied recursively to sub-groups 115, 120, 125, and 130, resulting in each sub-group being further subdivided into two sub-groups (135, 140, 145, 150, 155, 160, 165, and 170), as shown in FIG. 1F. Within each newly subdivided sub-group 115, 120, 125, and 130, the positions of the two new sub-groups are interchanged (135 with 140, 145 with 150, 155 with 160 and 165 with 170), as shown in FIG. 1G. At this point, the process is carried no further because each sub-group comprises a single object, and the group of objects 100 is in reverse order. In general, a group of $2^N$ objects may be reversed by recursively subdividing the group of objects into two sub-groups of equal size and interchanging the positions of the two sub-groups. Recursion terminates when each sub-group comprises a single object and adjacent pairs of single-object sub-groups have been interchanged.

Figure 2:
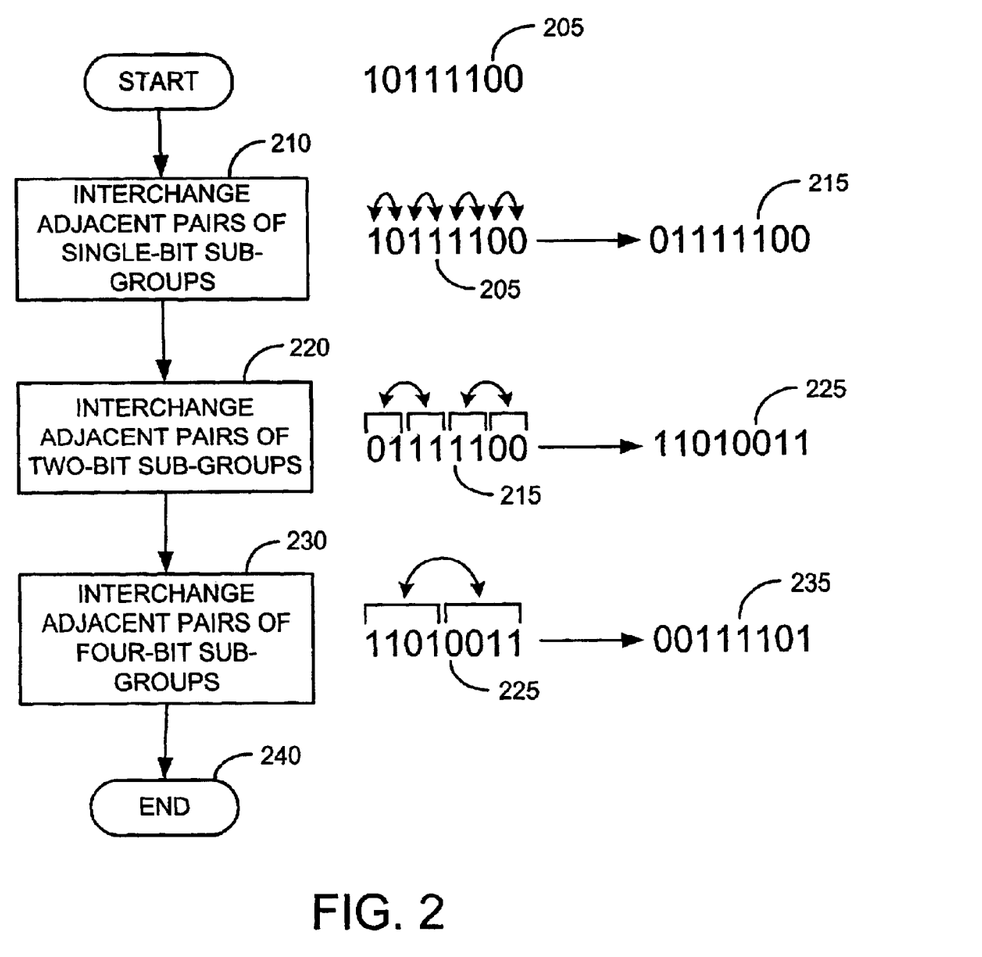
FIG. 2 is a flowchart and illustration showing how the invention may be applied to the reversal of bits in a computer storage register in accordance with an exemplary embodiment of the invention.

FIG. 2 is a flowchart and illustration showing how the invention may be applied to the reversal of bits in a computer storage register in accordance with an exemplary embodiment of the invention. The invention is particularly useful for reversing the order of the bits in a bit pattern using primitive instructions available in most modern microprocessors. In FIG. 2, byte 205 represents a bit pattern to be reversed. At 210, byte 205 is partitioned into eight sub-groups of one bit each, and the positions of adjacent pairs of single bits are interchanged to produce first intermediate result 215. At 220, first intermediate result 215 is partitioned into four sub-groups of two bits each, and the positions of adjacent pairs of two-bit sub-groups are interchanged to produce second intermediate result 225. At 230, second intermediate result 225 is partitioned into two sub-groups of four bits each, and the positions of the two four-bit sub-groups are interchanged to produce final result 235. The process is then terminated at 240. The method illustrated in FIG. 2 may be applied to any positive-integer-power-of-two register size. For example, a 32-bit word ($2^5$ bits) may be reversed in five partition-and-interchange steps. As mentioned previously, in reversing the order of a bit pattern comprising $2^N$ bits, the order in which the N partition-and-interchange steps are performed is arbitrary. For example, in FIG. 2, a variation in which two four-bit sub-groups are interchanged first, followed by the interchange of adjacent pairs of single-bit sub-groups, followed by the interchange of adjacent pairs of two-bit sub-groups, is equally valid.

Figure 3A:
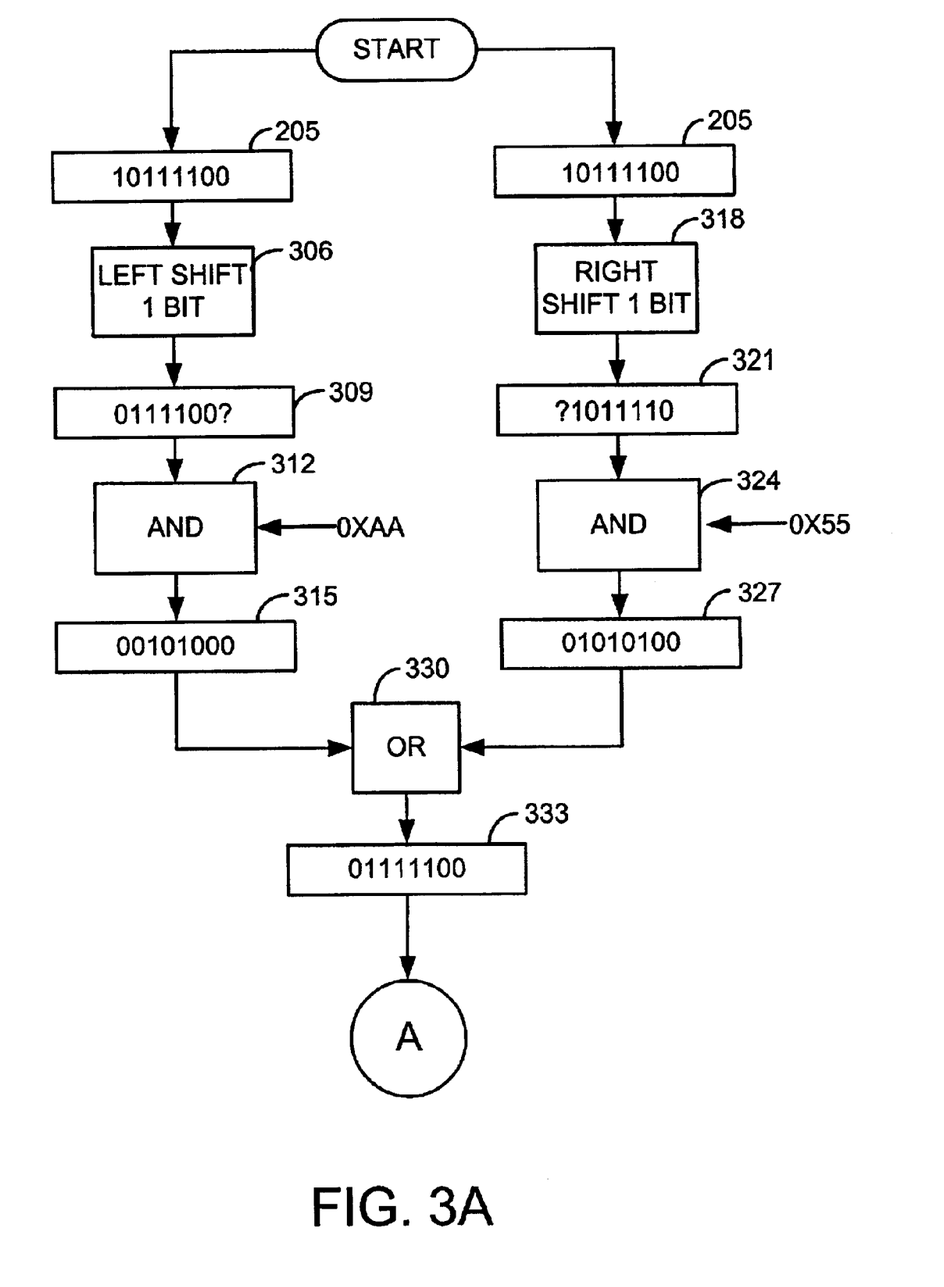
FIG. 3A is a diagram showing a first portion of the operation of an exemplary implementation of the method shown in FIG. 2.
Figure 3B:
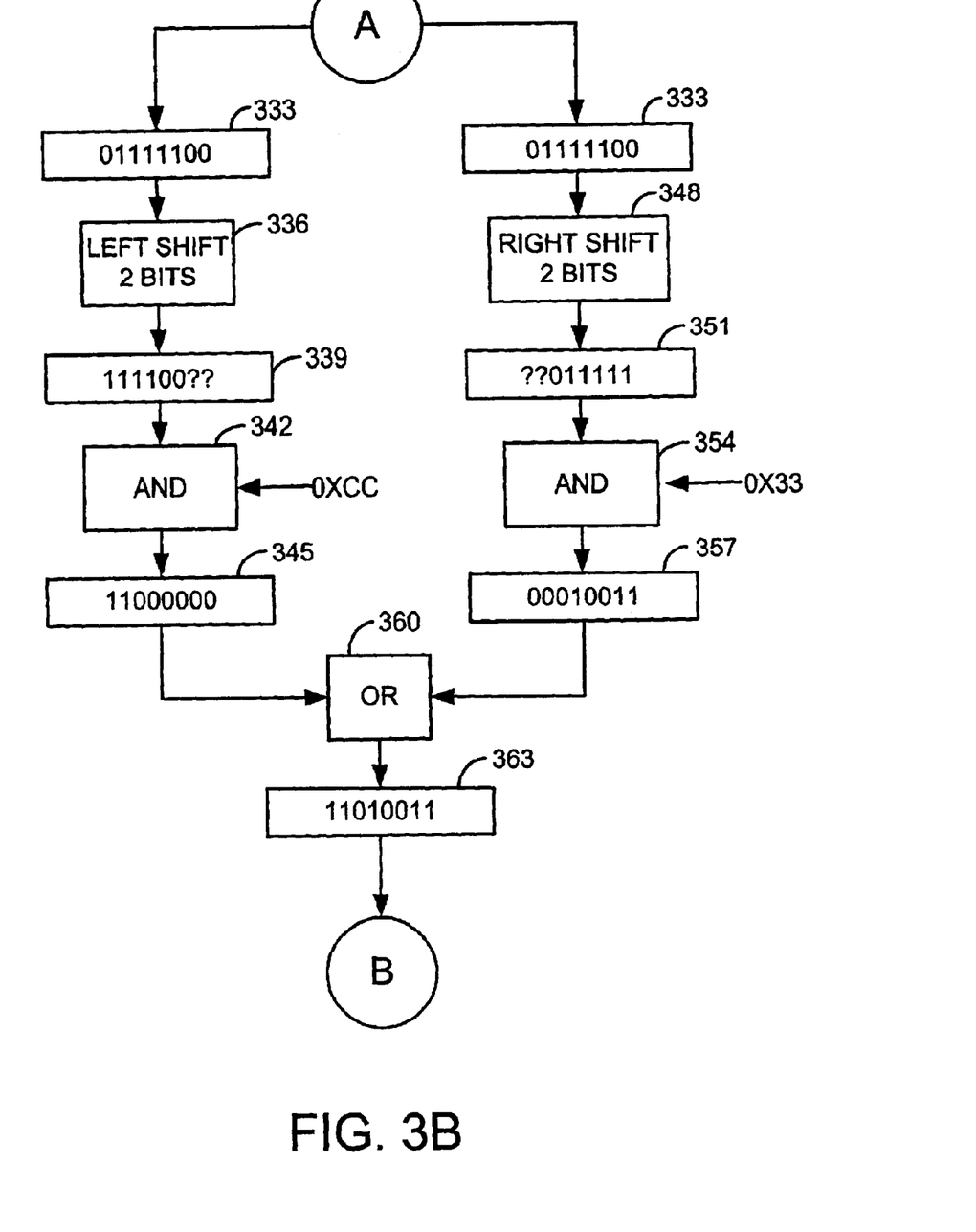
FIG. 3B is a diagram showing a second portion of the operation of an exemplary implementation of the method shown in FIG. 2.
Figure 3C:
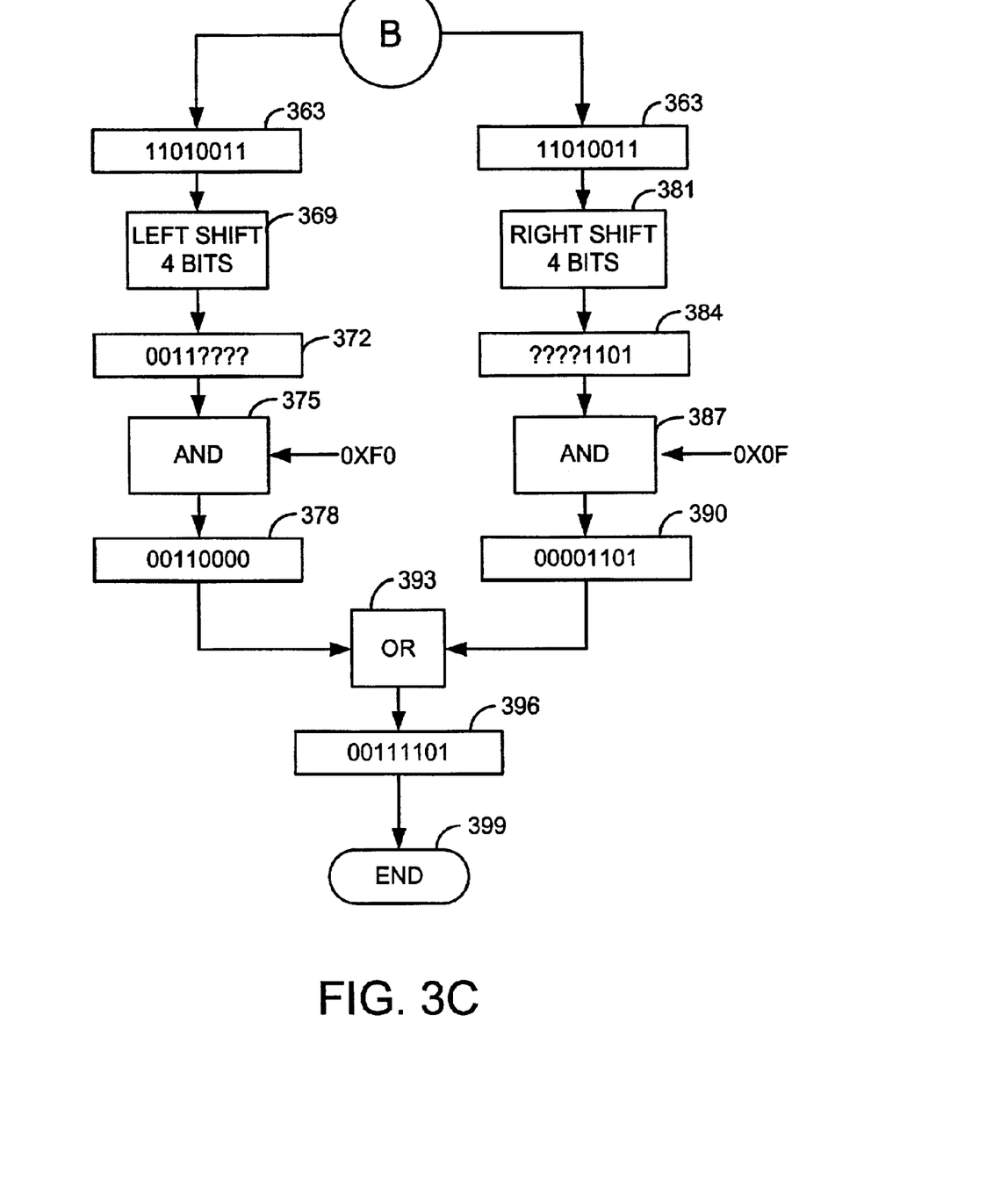
FIG. 3C is a diagram showing a final portion of the operation of an exemplary implementation of the method shown in FIG. 2.

There are many possible implementations to accomplish the interchange operation during each pass (partition-and-interchange step) of the method illustrated in FIG. 2. FIGS. 3A–3C show one way in which the interchange operation may be implemented: bit shifting and masking, which are readily available operations in most computing devices. The method shown in FIGS. 3A–3C is particularly advantageous because the position interchanges during each partition-and-interchange step occur simultaneously, providing true O(log (M)) performance. In FIG. 3A, byte 205 is left shifted by one bit at 306 to produce byte 309, which is bit-wise ANDed with hexadecimal constant 0xAA (binary 10101010) at 312 to produce a first intermediate result 315. Either sequentially or in parallel (if instruction-level parallelism is employed) with the foregoing steps, byte 205 is right shifted by one bit at 318 to produce byte 321. At 324, byte 321 is bit-wise ANDed with hexadecimal constant 0x55 (binary 01010101) to produce a second intermediate result 327. At 330, first intermediate result 315 is bit-wise ORed with second intermediate result 327 to produce result 333. Continuing to FIG. 3B, result 333 comprises the input for the second pass. Result 333 is left shifted by two bits at 336 to produce byte 339, which is in turn bit-wise ANDed with hexadecimal constant 0xCC (binary 11001100) at 342 to produce a first intermediate result 345. In analogous fashion, result 333 is also right shifted by two bits at 348 to produce byte 351, which is in turn bit-wise ANDed with hexadecimal constant 0x33 (binary 00110011) at 354 to produce a second intermediate result 357. At 360, first intermediate result 345 and second intermediate result 357 are bit-wise ORed to produce result 363. Continuing to FIG. 3C, result 363 comprises the input for the third and final pass. Result 363 is left shifted by four bits at 369 to produce byte 372, which is in turn bit-wise ANDed with hexadecimal constant 0xF0 (binary 11110000) at 375 to produce a first intermediate result 378. Result 363 is also right shifted by four bits at 381 to produce byte 384, which is in turn bit-wise ANDed with hexadecimal constant 0x0F (binary 00001111) at 387 to produce a second intermediate result 390. At 393, first intermediate result 378 and second intermediate result 390 are bit-wise ORed to produce final result 396, which is the original byte 205 in reverse order. The process terminates at 399.

Figure 4:
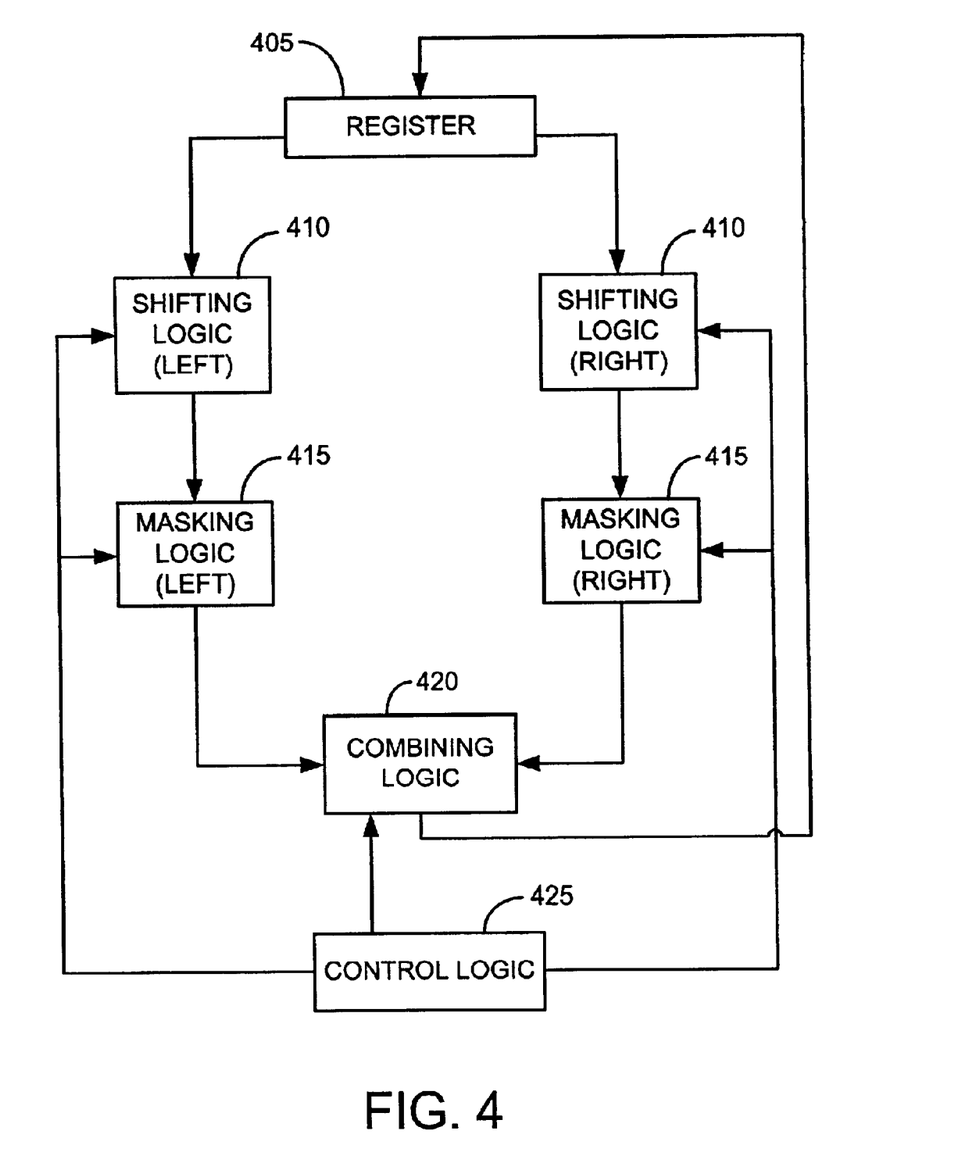
FIG. 4 is a functional block diagram of a circuit for performing the processing steps shown in the exemplary implementation of FIG. 3.
Figure 5A:
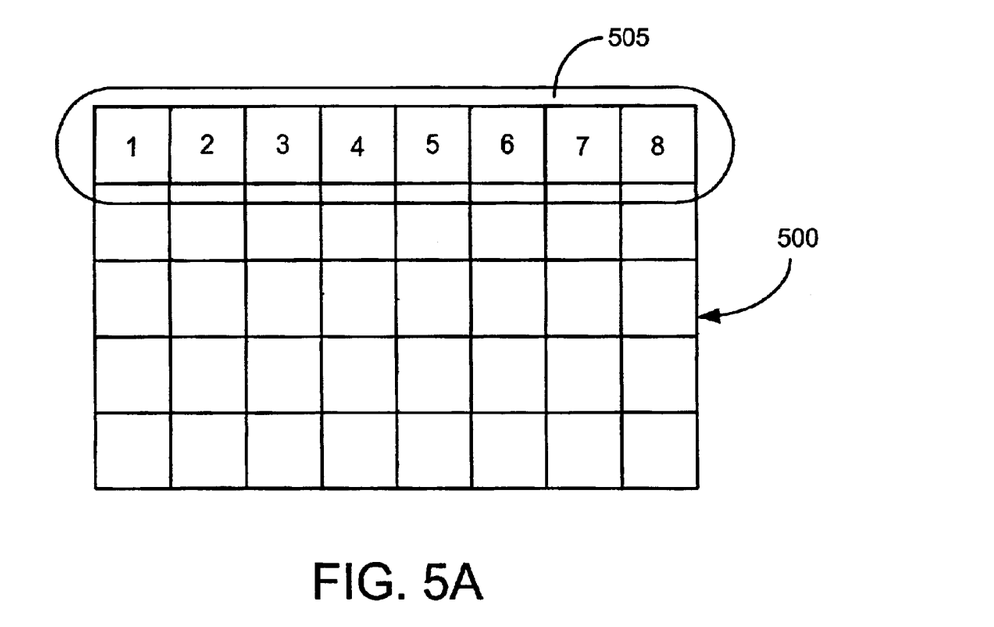
FIG. 5A is an illustration in accordance with another exemplary embodiment of the invention before a row of pixels has been reversed.
Figure 5B:
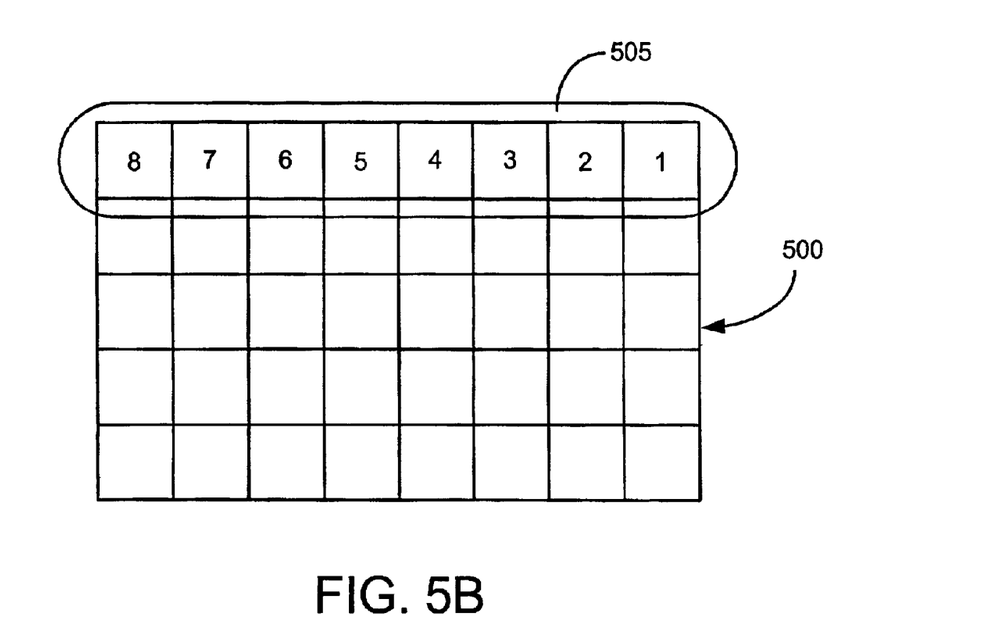
FIG. 5B is an illustration in accordance with another exemplary embodiment of the invention shown in FIG. 5A after the row of pixels has been reversed.

The exemplary embodiment discussed in connection with 3A–3C may be implemented in circuit form. FIG. 4 is a functional block diagram of a circuit to implement the method shown in FIGS. 3A–3C. Register 405 may store a bit pattern to be reversed. Shifting logic 410, shown in FIG. 4 as being divided into left and right portions for conceptual convenience, shifts the bits contained in register 405 left or right by a positive-integer-power-of-two number of bits, depending on which partition-and-interchange step of the method is being performed. Masking logic 415, also shown in the functional diagram of FIG. 4 as being divided into left and right portions, bit-wise ANDs the shifted bit pattern with a bit pattern comprising an alternating pattern of logical 1's and logical 0's, or vice versa. In general, the left-shifted bit pattern is ANDed with a bit pattern comprising j logical 1's followed by j logical 0's, for a left shift of j bits. Likewise, the right-shifted bit pattern is ANDed with a bit pattern comprising an alternating pattern of j logical 0's followed by j logical 1's, for a right shift of j bits. Combining logic 420 bit-wise ORs the output of masking logic 415 to produce a result that may be fed back to register 405. Control logic 425 controls the operation of shifting logic 410, masking logic 415, and combining logic 420. For example, control logic 425 may provide index j to shifting logic 410 and masking logic 415 to cause the correct bit shifting and masking operations to be performed during the jth partition-and-interchange step of the bit reversal process. Control logic 425 also coordinates the repetition of the shifting, masking, and combining operations through multiple partition-and-interchange steps until a final bit-reversed result is obtained. The circuit of FIG. 4 is readily implemented in available computer hardware. For example, shifting logic 410 may be implemented advantageously using a barrel shifter. Masking logic 415 and combining logic 420 may be implemented using the arithmetic logic unit within most microprocessors. Such arithmetic logic units may also contain additional registers for storing intermediate results, and a cache memory or on-chip read-only memory pages of memory, or pixels. For example, the invention may be applied to the reversal of the order of a string of alphanumeric characters, including digits drawn from number systems other than the binary number system. In the field of graphics, the need sometimes arises to reverse an image, either horizontally or vertically, to create a mirror image of the original. FIG. 5A is an illustration of a bit-mapped raster 500 on which an arbitrary row of pixels 505 has been identified (shown encircled). In FIG. 5A, the size of the pixels has been exaggerated for simplicity in describing the invention so that the eight pixels, numbered 1–8, represent an entire row or scan line of bit-mapped raster 500. Bit-mapped raster 500 may be associated with, for example, a computer monitor or other display device. The invention may be used to reverse the order of the row of pixels 505, resulting in the configuration shown in FIG. 5B. This process may be repeated on other lines of bit-mapped raster 500 to reverse the entire displayed image. Those skilled in the art will recognize that the same approach may be used to reverse an image vertically by applying the invention to columns of pixels instead of rows.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art. (ROM) may be available for storing bit patterns used frequently in masking operations. Control logic 425 may be implemented using a microprocessor or microcontroller executing stored program instructions, or using custom logic (e.g., a programmable logic device).

The exemplary embodiment shown in FIGS. 3A–3C may also be implemented as program code residing on a computer-readable storage medium. For example, the program code may, for the reversal of a bit pattern of length $2^N$, comprise a first code segment configured to shift the bit pattern to the left or to the right by j bits to produce a shifted bit pattern, j being a positive-integer power of two less than or equal to $2^{(N-1)}$; a second code segment configured to bit-wise AND the shifted bit pattern with an alternating pattern of j logical 1's followed by j logical 0's to produce a first intermediate result, when the bit pattern is shifted to the left by j bits, and to bit-wise AND the shifted bit pattern with an alternating pattern of j logical 0's followed by j logical 1's to produce a second intermediate result, when the bit pattern is shifted to the right by j bits; and a third code segment configured to bit-wise OR the first intermediate result with the second intermediate result to produce a combined result. The implementation may be extended by including a fourth code segment configured to invoke the first, second, and third code segments for each of N passes or partition-and-interchange steps (bit shifting, masking, and combining or bit-wise ORing). As explained previously, in all passes subsequent to the first pass, the combined result obtained during the previous pass becomes the bit pattern to which the bit shifting, masking, and combining (bit-wise ORing) operations are applied.

Although an exemplary embodiment of the invention has been described for reversing the order of bit patterns, the invention may just as easily be applied to reversing the order of a group of larger data objects such as bytes, words, sectors,

What is claimed is:

1. A circuit for reversing the order of bits in a bit pattern comprising $2^N$ bits, N being a positive integer, the circuit comprising:

a register to store the bit pattern;

shifting logic configured to shift the bit pattern to the left or to the right by j bits to produce a shifted bit pattern, j being a positive-integer power of two less than or equal to $2^{(N-1)}$, masking logic configured to bit-wise AND the shifted bit pattern with an alternating pattern of j logical 1's followed by j logical 0's to produce a first intermediate result, when the bit pattern is shifted to the left by j bits, and to bit-wise AND the shifted bit pattern with an alternating pattern of j logical 0's followed by j logical 1's to produce a second intermediate result, when the bit pattern is shifted to the right by j bits; and combining logic configured to bit-wise OR the first intermediate result with the second intermediate result to produce a combined result.

2. The circuit of claim 1, further comprising:

control logic configured to operate the shifting logic, masking logic, and combining logic for each of a set of varies of j ranging from one to $2^{(N-1)}$, the bit pattern comprising, for all values of j subsequent to a first value of j, the combined result associated with a previous value of j.

3. The circuit of claim 1, wherein the shifting logic comprises a barrel shifter.

4. A circuit for reversing the order of bits in a bit pattern of length $2^N$, N being a positive integer, the circuit comprising:

means for storing the bit pattern;

means for shifting the bit pattern to the left or to the right by j bits to produce a shifted bit pattern, j being a positive-integer power of two less than or equal to $2^{N-1}$, means for bit-wise ANDing the shifted bit pattern with an alternating pattern of j logical 1's followed by j logical 0's to produce a first intermediate result, when the bit pattern is shifted to the left by j bits, and for bit-wise ANDing the shifted bit pattern with an alternating pattern of j logical 0's followed by j logical 1's to produce a second intermediate result, when the bit pattern is shifted to the right by j bits; and means for bit-wise ORing the first intermediate result with the second intermediate result to produce a combined result.

5. The circuit of claim 4, further comprising:

means for activating the means for shifting, means for bit-wise ANDing, and means for bit-wise ORing for each of a act of values of j ranging from one to $2^{(N-1)}$, the bit pattern comprising, for all values of j subsequent to a first value of j, the combined result associated with a previous value of j.

6. The circuit of claim 4, wherein the means for shifting comprises a barrel shifter.

7. A computer-readable storage medium containing program code to reverse the order of bits in a bit pattern of length $2^N$, N being a positive integer, the computer readable storage medium comprising:

a first code segment configured to shift the bit pattern to the left or to the right by j bits to produce a shifted bit pattern, j being a positive-integer power of two less than or equal to $2^{(N-1)}$;

a second code segment configured to bit-wise AND the shifted bit pattern with an alternating pattern of j logical 1s followed by j logical 0's to produce a first intermediate result, when the bit pattern is shifted to the left by j bits, and to bit-wise AND the shifted bit pattern with an alternating pattern of j logical 0's followed by j logical 1's to produce a second intermediate result, when the bit pattern is shifted to the right by j bits; and a third code segment configured to bit-wise OR the first intermediate result with the second intermediate result to produce a combined result.

8. The computer-readable storage medium of claim 7, further comprising:

a fourth code segment configured to invoke the first, second, and third code segments for each of a set of values of j ranging from one to $2^{(N-1)}$, inclusive, the bit pattern comprising, for all values of j subsequent to a first value of j, the combined result associated with a previous value of j.

9. A method for reversing the order of bits in a bit pattern of length $2^N$ stored in a computer storage register, N being a positive integer that is at least two, the method comprising:

(a) partitioning the bit pattern into a act of sub-groups, each sub-group comprising an equal number of bits;

(b) interchanging the positions of adjacent pairs of sub-groups within the set of sub-groups; and (c) performing steps (a) and (b) for each of N unique sets of sub-groups, the bit pattern in step (a) comprising, for each of the last (N−1) unique sets of sub-groups, an altered bit pattern resulting from the performance of steps (a) and (b) for the prior unique sets of sub-groups.

10. The method of claim 9, wherein, for successive unique sets of sub-groups, the number of sub-groups in each unique set of sub-groups increases monotonically.

11. The method of claim 9, wherein, for successive unique sets of sub-groups, the number of sub-groups in each unique set of sub-groups decreases monotonically.

12. A method for reversing the order of bits in a bit pattern of length $2^N$ stored in a computer storage register, N being a positive integer that is at least two, the method comprising:

(a) selecting a set of N integers comprising all powers of two between 1 and $2^{(N-1)}$, inclusive;

(b) selecting, without replacement, a particular integer from the set of N integers;

(c) partitioning the bit pattern into sub-groups, each sub-group having a number of bits equal to the particular integer;

(d) interchanging the positions of adjacent pairs of sub-groups to produce a result; and (e) repeating steps (b), (c), and (d) for each of the remaining (N−1) integers in the set of N integers, e bit pattern in each subsequent application of step (c) comprising the result obtained from the performance of steps (b), (c), and (d) for the prior integers in the of N integers.

13. The method of claim 12, wherein the N integers are selected in monotonically increasing order in step (b).

14. The method of claim 12, wherein the N integers are selected in monotonically decreasing order in step (b).

15. A method for reversing, in N passes, the order of bits in a bit pattern of length $2^N$ stored in a computer storage register, N being a positive integer, the method comprising:

(a) shifting the bit pattern to the left by j bits to produce a left-shifted bit pattern, j equaling one during a first pass and doubling on each subsequent pass;

(b) bit-wise ANDing the left-shifted bit pattern with a first mask comprising an alternating pattern of j logical 1's followed by j logical 0's to produce a first intermediate result;

(c) shifting the bit pattern to the right by j bits to produce a right-shifted bit pattern;

(d) bit-wise ANDing the right-shifted bit pattern with a second mask comprising an adhering pattern of j logical 0's followed by j logical 1's to produce a second intermediate result;

(e) bit-wise ORing the first intermediate result with the second intermediate result to produce a combined result; and (f) repeating steps (a)–(e) for each of the remaining (N−1) passes, the bit pattern in steps (a) and (c) of each subsequent pass comprising the combined result from the immediately preceding pass.

16. The method of claim 15, wherein j equals N during a first pass and is halved on each subsequent pass.

* * * * *

UNITED STATES PATENT AND TRADEMARK OFFICE
CERTIFICATE OF CORRECTION

PATENT NO.         : 6,947,919 B2
APPLICATION NO.    : 09/957878
DATED              : September 20, 2005
INVENTOR(S)        : Jeffrey Naset et al.

It is certified that error appears in the above-identified patent and that said Letters Patent is hereby corrected as shown below:

In column 5, line 30, after "read-only memory" insert -- (ROM) may be available for storing bit patterns used frequently in masking operations. Control logic 425 may be implemented using a microprocessor or microcontroller executing stored program instructions, or using custom logic (e.g., a programmable logic device).
The exemplary embodiment shown in Figs. 3A-3C may also be implemented as program code residing on a computer-readable storage medium. For example, the program code may, for the reversal of a bit pattern of length $2^N$, comprise a first code segment configured to shift the bit pattern to the left or to the right by j bits to produce a shifted bit pattern, j being a positive-integer power of two less than or equal to $2^{(N-1)}$; a second code segment configured to bit-wise AND the shifted bit pattern with an alternating pattern of j logical 1's followed by j logical 0's to produce a first intermediate result, when the bit pattern is shifted to the left by j bits, and to bit-wise AND the shifted bit pattern with an alternating pattern of j logical 0's followed by j logical 1's to produce a second intermediate result, when the bit pattern is shifted to the right by j bits; and a third code segment configured to bit-wise OR the first intermediate result with the second intermediate result to produce a combined result. The implementation may be extended by including a fourth code segment configured to invoke the first, second, and third code segments for each of N passes or partition-and-interchange steps (bit shifting, masking, and combining or bit-wise ORing). As explained previously, in all passes subsequent to the first pass, the combined result obtained during the previous pass becomes the bit pattern to which the bit shifting, masking, and combining (bit-wise ORing) operations are applied.
Although an exemplary embodiment of the invention has been described for reversing the order of bit patterns, the invention may just as easily be applied to reversing the order of a group of larger data objects such as bytes, words,
sectors, --.

In columns 5-6, lines 62-67 and 1-30, delete "(ROM) may be available for storing bit patterns used frequently in masking operations. Control logic 425 may be implemented using a microprocessor or microcontroller executing stored program instructions, or using custom logic (e.g., a programmable logic device).
The exemplary embodiment shown in ............sectors,".

In column 6, line 54, in Claim 2, delete "varies" and insert -- values --, therefor.

In column 6, line 67, in Claim 4, delete "$2^{N-1)}$" and insert -- $2^{(N-1)}$ --, therefor.

In column 7, line 15, in Claim 5, delete "act" and insert -- set --, therefor.

UNITED STATES PATENT AND TRADEMARK OFFICE
CERTIFICATE OF CORRECTION

PATENT NO. : 6,947,919 B2
APPLICATION NO. : 09/957878
DATED : September 20, 2005
INVENTOR(S) : Jeffrey Naset et al.

It is certified that error appears in the above-identified patent and that said Letters Patent is hereby corrected as shown below:

In column 7, line 31, in Claim 7, delete "1s" and insert -- 1's --, therefor.

In column 7, line 52, in Claim 9, delete "act" and insert -- set --, therefor.

In column 8, line 2, in Claim 9, delete "stops" and insert -- steps --, therefor.

In column 8, line 22, in Claim 12, delete "e bit" and insert -- the bit --, therefor.

In column 8, line 25, in Claim 12, after "in the" insert -- set --.

In column 8, line 45, in Claim 15, delete "adhering" and insert -- alternating --, therefor.

Signed and Sealed this

Fifteenth Day of December, 2009

David J. Kappos
*Director of the United States Patent and Trademark Office*